L. P. ALFORD.
ROLLER BEARING.
APPLICATION FILED DEC. 12, 1907.
915,649.
Patented Mar. 16, 1909.
2 SHEETS—SHEET 1.
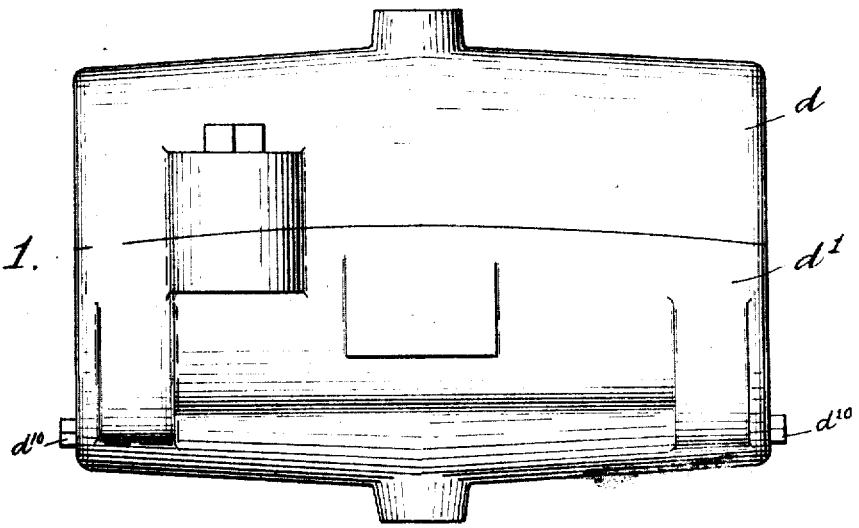
Fig. 1.
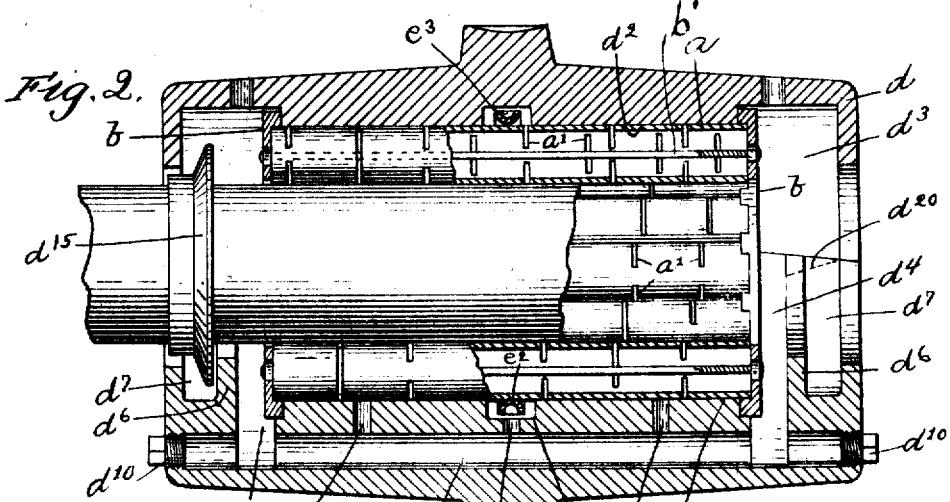
Fig. 2.
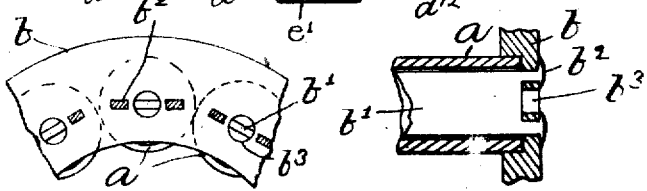
Fig. 3.
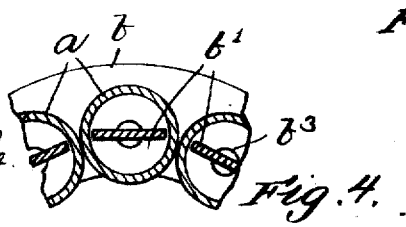
Fig. 4.
Fig. 5.
Witnesses:
H. B. Davis.
Cynthia Doyle.
Inventor:
Leon P. Alford
by Hayes & Harriman
attys

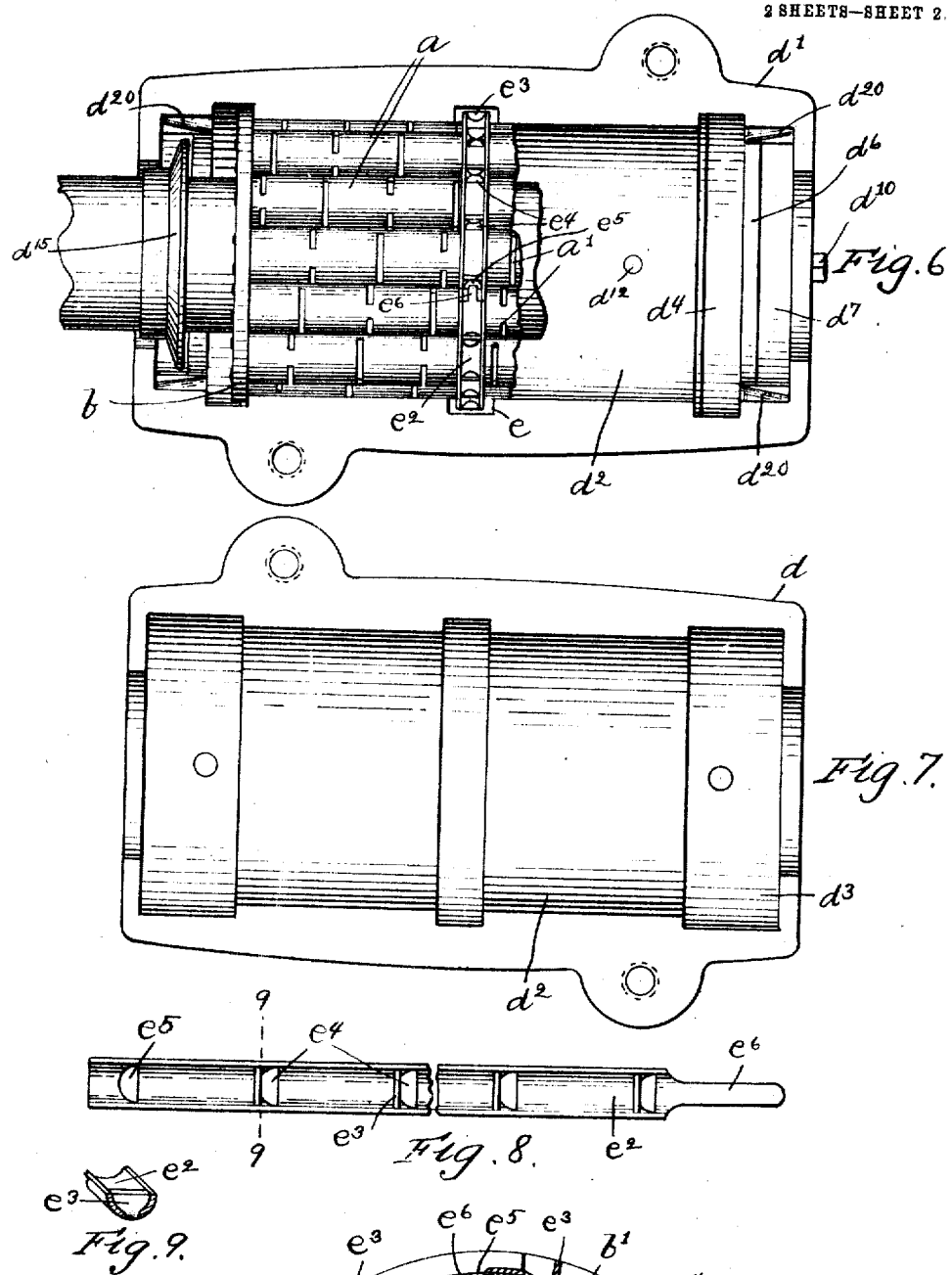
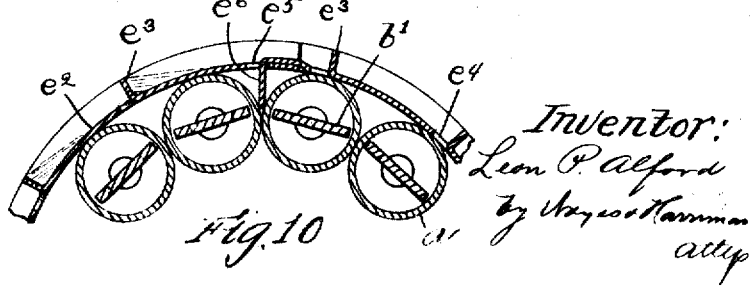

UNITED STATES PATENT OFFICE.

LEON P. ALFORD, OF NEW YORK, N. Y., ASSIGNOR TO BOSTON TOOL COMPANY, OF CAMBRIDGE, MASSACHUSETTS, A CORPORATION OF MASSACHUSETTS.

ROLLER-BEARING.

No. 915,649.

Specification of Letters Patent.

Patented March 16, 1909.

Application filed December 12, 1907. Serial No. 406,219.

*To all whom it may concern:*

Be it known that I, LEON P. ALFORD, of New York, borough of Manhattan, State of New York, have invented an Improvement in Roller-Bearings, of which the following is a specification.

This invention relates to roller bearings and has for its object to provide the box with an intermediate bearing portion having engaging faces at its ends, and to construct the roller-supporting cage in such manner that the inner faces of its end plates will engage the ends of the bearing portion when the cage is thrust longitudinally, the bearing portion thereby resisting endwise movement of the cage; and to provide the box with oil-containing recesses at the ends of the bearing portion and to so arrange the end plates of the roller-supporting cage that they may enter said recesses and turn in the oil which is contained therein and carry up the oil and distribute it to the rollers; also, to construct an improved form of roller-supporting cage which will not twist or distort when subjected to severe torsional strain, which will support the rollers in such manner that they may freely rotate, and which will provide for distributing oil to the interior of the rollers; also, to provide the shaft with collars which prevent the oil from moving along on the shaft and to provide oil-receiving recesses at the ends of the box adapted to catch oil which drips from the shaft or which may otherwise be caused to enter them, and to so arrange the collars on the shaft and to so construct them that they will enter said recesses and will act to throw out the oil contained therein; also, to arrange said oil-receiving recesses adjacent said oil-containing recesses and to provide partition walls between them over which the oil is thrown by the collars which turn in the oil-receiving recesses, whereby the oil is returned to the oil-containing recesses; also, to provide a bearing portion for the box with an annular recess at a point intermediate its length, which is in open communication with the settling chamber connecting the oil-containing recesses, and to arrange in said recesses an improved form of oil-conveying ring which is arranged to take the oil from the bottom part of the recess and carry it up and deliver it upon the rollers and other parts, for the purpose of establishing a circulation of oil in the box, which results in not only lubricating the parts but also in washing them, removing therefrom all foreign particles; also, to provide means for positively driving said oil-conveying ring.

Figure 1 is a front elevation of a roller-bearing embodying this invention. Fig. 2 is a longitudinal, vertical section of the same. Figs. 3, 4 and 5 are details of a portion of the roller-supporting cage. Fig. 6 is a plan view of the lower part of the box and a portion of the roller-supporting cage, rollers and shaft therein. Fig. 7 is an under side view of the upper part of the box. Fig. 8 is a plan view of the oil-conveying ring straightened out. Fig. 9 is a sectional detail of said ring. Fig. 10 is a detail showing in longitudinal section a portion of the oil-conveying ring.

$a$ represents one of the rollers of the set, any desirable number of which are employed. They are made cylindrical and tubular, of thin material, and are herein shown as of the same diameter from end to end and are supported at their opposite ends by the circular end plates $b$, $b$, of the cage. The end plates $b$ are each provided with a circularly arranged series of circular sockets which receive the ends of the rollers. The ends of the rollers loosely fit the sockets and turn freely therein. Each roller is provided with a series of transverse slits $a'$, which extend 90 degrees or more about its circumference. These slits are arranged in pairs, the slits of each pair being oppositely disposed, and the successive pairs of slits are arranged with the slits of each pair disposed opposite the spaces between the slits of the adjacent pair. The slits formed in each roller of the set are staggered with respect to the slits of the adjacent rollers, as best shown in Figs. 2 and 6, so that the sections of the rollers between the slits will not form tracks in the bearing portion which they engage. The slits may be merely saw cuts in the rollers, and in addition to giving flexibility to the rollers permit the free passage of oil and thus aid in distributing it to the bearing portion.

The end plates $b$, $b$, of the cage are made as flat circular rings and are socketed on their inner faces to receive the ends of the rollers. They are made large enough in diameter to extend beyond the bearing points of the rollers, and the edges which thus extend beyond said bearing-points, enter recesses which are provided at the opposite ends of the bearing portion. The two end plates are rigidly secured together, and the means herein shown for accomplishing this result consists of bars $b'$, which are made long enough to engage said plates and hold them with their inner faces in engagement with or close to the opposite ends of the bearing portion, so that longitudinal thrust of the cage is resisted by the end plates engaging the ends of the bearing portion. The connecting-bars $b'$ are preferably made as flat bars, formed at each end with a pair of spurs $b^2$, which project through holes in the end plates, and which are upset or riveted to the end plates. The spurs are separated so that the ends of the bars between the spurs form flat abutting faces which bear against the inner faces of the end plates. For convenience, these flat bars may extend through the tubular rollers or they may be otherwise arranged. As many of these bars will be provided as desired. By providing flat bars, as herein shown, having at each end a plurality of spurs and an abutting face it will be seen that a very rigid cage is produced, which will not twist or distort when subjected to severe torsional strains. The end plates $b$ are also provided with a series of small holes $b^3$, which extend through them at points opposite the ends of the tubular rollers, to thereby provide for the passage of oil therethrough and into the rollers.

The recesses at the ends of the bearing portion of the box are adapted to contain oil and as the edges of the end plates of the cage enter said recesses the oil will be picked up by them and caused to flow through the holes therein, into the tubular rollers and thence through the slits of said rollers into contact with the bearing portion of the box.

The box is cylindrically formed and is divided longitudinally into two parts $d$, and $d'$. It is made hollow and its circularly formed ends are each provided with a circular hole for the shaft. Within the box a cylindrical two part bearing portion $d^2$ is formed, which extends nearly from end to end thereof, upon or against which the rollers bear, the two parts of said bearing portion being formed respectively on the interior of the two parts $d$, and $d'$, and the meeting edges of the two parts of the bearing portion being curved to correspond with the curvature of the meeting edges of the two parts of the box on which they are respectively formed. The bearing portion $d^2$ is made of the same diameter from end to end and at each end thereof an annular recess is formed in the box. By making the bearing portion in this manner it may be easily machined, the tool running from start to finish without change. The opposite ends of the bearing portion $d^2$ are formed at right angles to the bearing surface and present engaging faces against which the inner faces of the end plates of the cage abut when said cage is subjected to an end thrust. By thus forming the bearing portion and constructing the cage with end plates which are adapted to engage the ends thereof very efficient means are provided for restraining endwise movement of the cage and no other means need be employed.

In the upper part $d$ of the box the upper portions of said recesses, represented at $d^3$, extend from the ends of the bearing portion to the ends of the box; and in the lower part $d'$ the lower portions of said recesses, represented at $d^4$, extend from the ends of the bearing portion to partition walls $d^6$ rising from the bottom of the box at points substantially midway between the ends of the bearing portion and the ends of the box, and between said partition walls $d^6$ and the ends of the box shallow recesses $d^7$ are formed. The recesses $d^4$ are adapted to contain a supply of oil and are herein termed oil-containing recesses, and the recesses $d^7$ are adapted to receive oil which may drip from the shaft or which may be otherwise caused to enter them and are herein termed oil-receiving recesses. An oil passage $d^5$ extends along the under side of the part $d'$ of the box, from end to end thereof, which is in open communication with the oil-containing recesses $d^4$. This passage $d^5$ serves as the settling chamber and is herein so called. It extends through the partition walls $d^6$ and beneath the recesses $d^7$ and is provided at its ends, at the ends of the box, with exits which are closed by screw plugs $d^{10}$. The oil fills the settling chamber $d^5$ and rises some little distance in the oil-containing recesses $d^4$. Along the middle of the bearing portion $d^2$, in the lower part of the box, holes $d^{12}$ are formed which extend down to the settling chamber $d^5$, thereby enabling the oil to rise through said holes into contact with the surface of the bearing portion.

The shaft has secured to it suitable collars $d^{15}$, having outwardly extended flanges, and these collars are arranged on the shaft so that the flanges thereof may enter the oil-receiving recesses $d^7$. These flanged collars prevent the oil from moving along on the shaft and by turning in the recesses $d^7$ act to lift the oil and carry it up and throw it in a direction to enable it to pass over the tops of the partition walls $d^6$. To facilitate the passage of the oil over the partition walls and into the oil-containing recesses $d^4$, passageways $d^{20}$ are formed at the ends of said partition walls, extending from the recesses $d^7$ to the recesses $d^4$ at the top of the partition walls.

At a point substantially midway the length of the bearing portion $d^2$ an annular recess $e$ is formed, which is in open communication with the settling chamber $d^5$, by means of a hole $e'$, so that the oil from said chamber rises in said recess. An oil-conveying ring is contained in said recess which is adapted to take the oil and carry it up and deliver it upon the rollers and other parts. This ring is composed of a strip of metal e, made to encircle the rollers and is formed semicircularly in cross section. It has semicircular or other shaped portions $e^3$ cut from it, but not detached, which are turned up at right angles and in connection with the strip, form buckets or reservoirs which become filled with oil as the ring revolves. The openings $e^4$, formed by thus cutting the strip, serve as exits for the oil, so that as the ring revolves the oil from the recess $e$ is taken and carried up by the conveying ring and is discharged through the exits thereof upon the rollers and other parts. One end of the ring-like strip $e$ is formed with a hole $e^5$ and the opposite end with a tongue $e^6$ which is adapted to be projected through said hole $e^5$, to connect the ends of the ring together, and said tongue is extended in a radial direction toward and between the rollers so that the ring is connected with the set of rollers in such manner as to be revolved by them, being thus positively driven. This manner of forming the oil-conveying ring is simple, yet it is obvious that it may be otherwise formed and also otherwise positively driven and yet come within the scope of this invention.

By means of a positively driven oil-conveying ring the oil is carried upward from the oil-containing recess in such quantities that it will not only lubricate the parts but will wash away foreign particles and thereby cleanse the parts, a continuous circulation of oil within the box being established.

By dividing the box in two parts, as herein shown, the joint which extends from end to end thereof is not horizontal and hence the pressure of the rollers on the bearing portion, as they pass from one part to the other is gradual and the action at such point is gradual, and furthermore the two parts of the box may be easily centered when assembled.

Having thus described my invention, what I claim as new and desire to secure by Letters Patent is:—

1. In a roller bearing, a roller-supporting cage consisting of a pair of end plates provided with sockets for receiving the ends of a set of rollers and having holes through the socketed portions thereof for the passage of oil, bars rigidly connected at their ends with said end plates at the socketed portions thereof, and a set of tubular rollers arranged in said sockets through which said connecting bars extend, substantially as described.

2. In a roller bearing, a roller-supporting cage consisting of a pair of end plates provided with sockets for receiving the ends of a set of rollers, and having holes in the socketed portions thereof for receiving the ends of the connecting bars and also having holes in the socketed portions thereof for the passage of oil, connecting bars formed at their ends with abutting faces and a pair of spurs for engaging the socketed portions of said end plates to thereby connect the two end plates together, and a set of tubular rollers arranged in said socket through which said connecting portions extend, substantially as described.

3. In a roller bearing, a box having an intermediate bearing portion formed at each end with an engaging-face, a roller-supporting cage having end plates which extend over the ends of said bearing portion and engage said ends, whereby end thrust of the cage is resisted by said bearing portions, said end plates being provided with sockets which receive the ends of a set of rollers, and a set of rollers made longer than the bearing portion of the box, and of the same diameter from end to end, the ends of said rollers which extend beyond the ends of the bearing portion of the box entering the sockets in said end plates, substantially as described.

4. In a roller-bearing, a box having an intermediate bearing portion of the same diameter from end to end and having an engaging face at each end and having an annular oil-containing recess at each end of said bearing portion, and a roller supporting cage having end plates which extend over the ends of said bearing portion and engage said ends when the cage is thrust endwise, and which enter said recesses substantially as described.

5. In a roller bearing, a box having an intermediate bearing portion formed at each end with an engaging-face, a roller-supporting cage having end plates which extend over the ends of said bearing portion and engage said ends, whereby end thrust of the cage is resisted by said bearing portion, and a set of rollers supported by said cage, the bearing portions of which are made longer than the bearing portion of the box, substantially as described.

6. In a roller bearing, a box having a bearing-portion and oil-containing recesses at the opposite ends thereof, a roller supporting cage consisting of a pair of end plates connected together having oil-passages through them, the edges of said plates extending into said recesses and a set of tubular rollers supported by said end plates at points opposite the oil-passages therethrough, substantially as described.

7. In a roller-bearing, a box having a bearing-portion, oil-containing recesses at the opposite ends of said bearing-portion, and oil-receiving recesses beyond said oil containing recesses adapted to receive collars on the shaft, substantially as described.

8. In a roller-bearing, a box having a bearing portion, an oil-containing recess and an oil-receiving recess at each end of said bearing portion, a partition wall separating said recesses at each end of but remote from the bearing portion, over which the oil passes, substantially as described.

9. In a roller bearing, a box having a bearing portion for a set of rollers, having an annular recess and a ring contained in said recess having external oil-containing reservoirs and exits for said reservoirs, substantially as described.

10. In a roller bearing, a box having a bearing portion for a set of rollers, and having an annular recess, a ring contained in said recess having oil-containing reservoirs and exits and means for revolving said ring, substantially as described.

11. In a roller bearing, a set of rollers, a box having a bearing portion for said rollers and having an annular recess, an oil-conveying ring encircling said set of rollers which is contained in said recess consisting of a circularly formed strip having a tab at one end and a hole at the other end through which said tab is extended, said tab also engaging the rollers to connect the ring therewith, substantially as described.

12. In a roller bearing, a set of rollers, a box having a bearing portion for said rollers and having an annular recess, an oil-conveying ring encircling said set of rollers which is contained in said recess consisting of a transversely bent, circularly formed strip having means for connecting its ends together and for engaging the rollers to connect it therewith, and having oil-containing reservoirs and exits, substantially as described.

In testimony whereof, I have signed my name to this specification, in the presence of two subscribing witnesses.

LEON P. ALFORD.

Witnesses:
B. J. NOYES,
H. B. DAVIS.